Oct. 29, 1968 LE ROY T. ROSSER 3,407,926
TIRE PACKAGING
Filed Feb. 18, 1966 2 Sheets-Sheet 1

INVENTOR
Le Roy Thomas ROSSER
AGENT

Oct. 29, 1968  LE ROY T. ROSSER  3,407,926
TIRE PACKAGING

Filed Feb. 18, 1966　　　　　　　　　　2 Sheets-Sheet 2

INVENTOR
Le Roy Thomas ROSSER

AGENT

United States Patent Office

3,407,926
Patented Oct. 29, 1968

3,407,926
TIRE PACKAGING
Le Roy Thomas Rosser, Barrie, Ontario, Canada, assignor to Lee Rosser & Associates Ltd., Ontario, Canada, a company of Canada
Filed Feb. 18, 1966, Ser. No. 528,524
3 Claims. (Cl. 206—65)

ABSTRACT OF THE DISCLOSURE

The present invention relates to a new tire package comprising a pair of tires mounted in side by side relationship on a tube having end flanges positioned to protect and hold the tires on the tube.

---

The present invention relates to a new system of packaging resilient annular articles, more particularly to a system of packing tires wherein a pair of tires are mounted on a spool-like element and to a new method of handling tires.

Present practice in packaging of tires to protect the white wall is either by wrapping same with paper which is a relatively expensive procedure, or more recently, by encasing the tire in a plastic film and forming the film about the tire. Both of these systems are not satisfactory since they severely limit the height to which the tires may be piled and secondly, they require relatively inconvenient handling compared with the present system.

Another problem in packaging tires is particularly prevalent with tubeless tires wherein spacers are sometimes required to prevent compression of the beads of the tires together. (See U.S. Patent 2,573,664.) One attempt to replace these spacers in the tires has been to use inflatable tubes as evidenced by Canadian Patent 620,-847. The inflatable tube of this patent engages and holds the beads of the tires separately. However, this system is obviously relatively expensive compared with the present invention.

Conventionally, tires are stacked, either in racks or on pallets and are handled manually or by means of lift trucks and the like. These conventional systems waste a lot of warehouse space particularly when large numbers of tires are being handled.

It is therefore an object of the instant invention to provide a novel system of packaging tires together with a novel system of handling and warehousing these tire packages.

Packages constructed according to the present invention not only are well suited for applicant's warehousing system but also may readily be applied to improve conventional pallet warehousing and handling systems.

It is a further object of the present invention to provide a package that permits relatively high stacking of compressible annular articles such as tires. Yet another object of the present invention is to provide a tire package that permits high stacking without compression of the tire beads together.

A further object of the present invention is to provide a tire package that facilitates handling.

Figure 1:
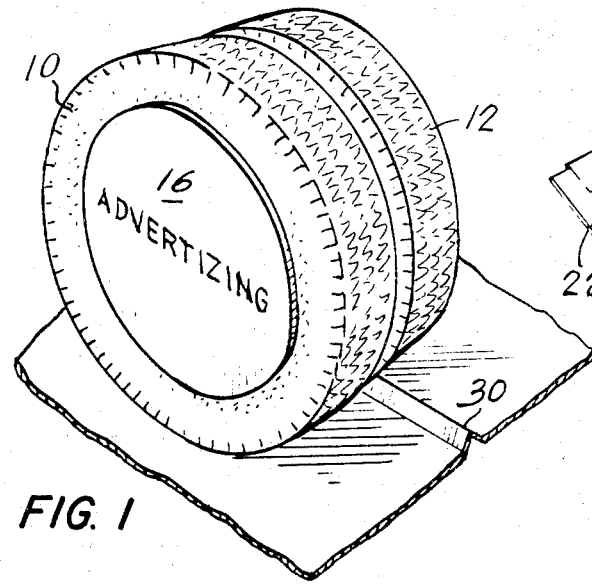
Figure 2:
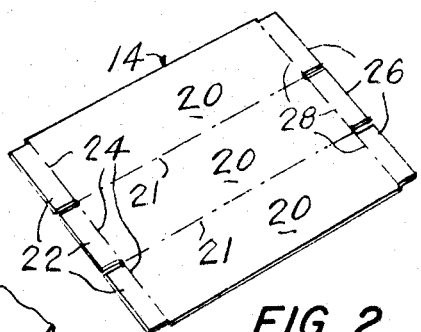
Figure 3:
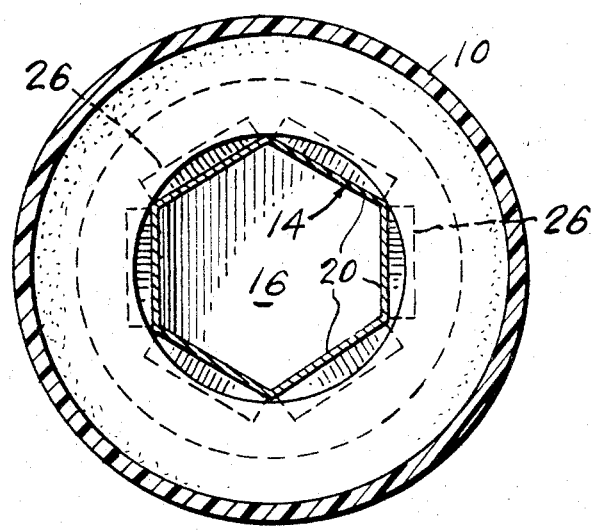
Figure 4:
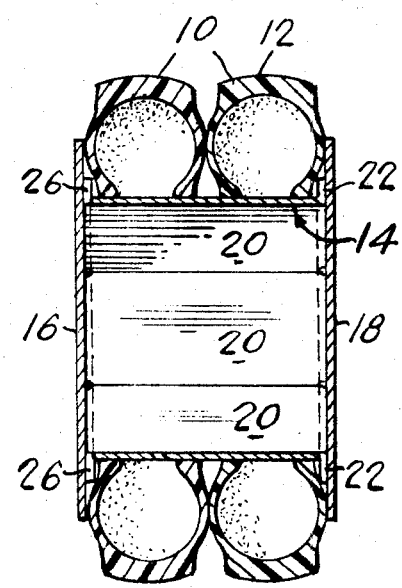
Figure 5:
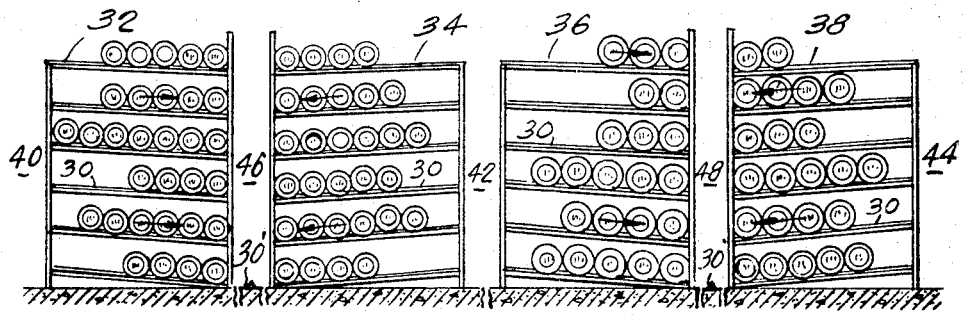
Figure 6:
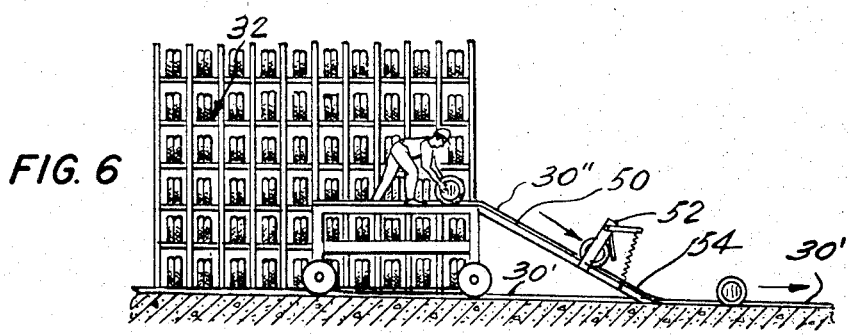
Figure 7:
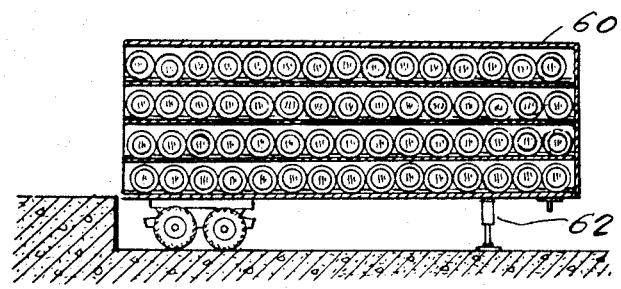

Further features, objects and advantages will be evident from the following detailed description and the accompanying drawings in which:

FIG. 1 is a perspective view of the package.
FIG. 2 is a plan view of a collapsed tube for use with the present invention.
FIG. 3 is a transverse cross-section of the package and
FIG. 4 is a longitudinal cross-section of the package.
FIG. 5 is an elevation view showing a plurality of racks for use with applicant's tire handling system.
FIG. 6 is an end view of a rack for applicant's system illustrating a buggy to facilitate tire feeding and FIG. 7 is a sectional view of a trailer incorporating racks for handling tires in accordance with the present invention.

Generally, a package according to the present invention will contain two tires in side by side relationship with a tubular structure extending through the holes therein and with end flanges on the tube overlying at least part of the exposed side walls of the tires. It is evident that more than two tires may be included in one package, however, it is preferred to limit any package to include only two tires to simplify handling and facilitate warehousing as described herein below. For stacking it is important that not too many tires be included in one package since the bottom tire in each package bears the weight of all the other tires in the package and this weight should not be sufficient to force the beads of the bottom tire together.

As shown in the drawings, a pair of tires 10 and 12 are mounted in side by side relationship on a substantially coaxially extending tubular member 14. The maximum diameter of said tubular member 14 is substantially equal to the minimum or internal diameter of the tires 10 and 12 as illustrated in FIG. 3. A pair of end discs 16 and 18 are glued or otherwise attached on opposite ends of the tubular member 14. Thus the tires 10 and 12 are arranged on a spool-like element, the end discs of which may serve to protect the side walls of the tires.

The tubular member 14 preferably is collapsible into a flattened condition substantially as shown in plan in FIG. 2 to facilitate shipping. In the illustrated embodiment a hexagonal tube made from corrugated box board of suitable strength has been disclosed. It is apparent that a tube having any desirable number of side walls 20 may be used, bearing in mind that the collapsible structure is preferred. Each of the side walls 20 is joined to the adjacent side wall 20 by a crease line 21, there being of course a manufacturer's joint provided to form the tubular structure.

In the illustrated embodiment each of the side walls 20 has, at one end, a flap 22 hinged thereto by crease line 24 and at the opposite end a flap 26 connected via crease line 28. Not all of the side walls 20 need have these flaps. For example, alternative side walls may be provided with flaps 22 and 26 respectively, thereby to reduce the material requirement of each unit.

Flaps 22 and 26 are preferably bent outwardly to provide a surface to which the discs 16 and 18 may be secured in any suitable manner, preferably by glueing.

Generally, if the tires packaged have white side walls it is desirable to mount them so that the white walls faced inwardly and are therefore protected.

Suitable advertising may be printed onto the discs 16 and 18 for display purposes. By advertising on the discs 16 and 18 the manufacturer has direct control over the literature appearing with the tires and in this way is assured the message reaches the consumer.

Tire packages as above described lend themselves to handling in apparatus of the type disclosed in FIGS. 5 to 7 inclusive. The warehousing arrangement shown in FIG. 5 comprises a plurality of inclined troughs or chutes down which the tire packages roll by gravity. The two tires packaged side by side provide a relatively stable package that will not tip or turn readily and therefore requires little in the way of guide means for controlling as the packages roll down the incline. In FIGS. 1 and 6 a central ridge 30 is shown which engages in the valley formed between the two tires and guides the tire package. External guide means engaging the outside of the tires may be used if desired.

As shown in FIG. 5 a plurality of racks 32, 34, 36 and 38 have been shown. Alternate loading aisles 40, 42 and 44 and unloading aisles 46 and 48 provide access to the tire packages. Racks or chutes set up in the manner shown provide a convenient way of storing tires, i.e., different sizes and qualities will each have their own chute and with applicant's system the first in is always the first out. The tire packages automatically roll from the loading end to the unloading end. Suitable means will of course be provided to prevent the tires from rolling out of the racks. While the racks 32, 34, etc., have been shown to be six tiers high, obviously there may be as many tiers as desired.

In each of the unloading aisles illustrated, a centre guide means 30' similar to the guide means 30 is provided. By sloping the floor slightly it is merely necessary to let the tires roll down along the guides 30' to their destination. The tire packages may be turned en route by simply curving the guide means 30' and if desired by superelevation. Care must be taken that any turns on the guide means 30' be sufficiently long to prevent binding of the tires as they roll around the corner.

A buggy 50 for unloading tires from the higher racks is shown in FIG. 6. This buggy 50 has a track 30'' similar to and matching with the guide 30' to deliver the tires onto this guide 30'. A controlling device 52 may be provided on the incline section 54 of the buggy 50 to limit the speed of the tires leaving the buggy. The buggy 50 is moved down the aisles 46 or 48 and the desired tire packages are selected by the operator and rolled down along the inclined section 54. If desired the height of the buggy may be adjustable or separate buggys may be used for every third or fourth tier of tire racks.

FIG. 7 shows a cross-section of a semi-trailer 60 specially designed for transporting tires using applicant's handling system. During loading a jack 62 at the front end of the trailer is lowered to incline the racks towards the front end so that the tires will roll forward. During unloading the jack 62 is raised so that the tire packages roll to the back of the trailer. Of course the tires will be locked in position during transport.

The tubular or spool-like package herein disclosed thus not only provides protection for the tire but also permits simplified handling. Furthermore the package of the present invention permits piling of the tires in conventional handling systems much higher than was heretofore practical with tires packaged singly. This is because the load of the tires is borne mainly by the tubular member 14 and collapsing of the tires is substantially avoided.

Applicant has disclosed a tire package and handling system modifications of which will be evident to those skilled in the art without departing from the spirit of the invention as defined in the appended claims.

I claim:

1. A tire package comprising; a pair of tires in side by side relationship, an erected knock-down core extending axially through said tires, the maximum diameter of said core being substantially equal to the internal diameter of said tires, a pair of flanges connected one to each axial end of said core said flanges engaging exposed side walls of said tires and confining said tires on said core.

2. A tire package as defined in claim 1 wherein said core consists of a plurality of side members articulated together along their lateral edges and foldable to a collapsed position.

3. A tire package as claimed in claim 2 wherein said flanges are connected to said ends by flaps hingedly connected to the end edges of at least some of said side members.

References Cited

UNITED STATES PATENTS

| | | | |
|---|---|---|---|
| 671,446 | 4/1901 | Lorscheider | 206—59 |
| 1,476,319 | 12/1923 | Angier | 206—46 |
| 1,673,740 | 6/1928 | Eide | 193—41 |
| 2,812,854 | 11/1957 | Fletcher | 206—59 |
| 2,928,540 | 3/1960 | Cunningham | 206—65 |

FOREIGN PATENTS 1,104,426  4/1961  Germany.

WILLIAM T. DIXSON, JR., *Primary Examiner.*